US012630298B2

(12) United States Patent
Joret et al.

(10) Patent No.: US 12,630,298 B2
(45) Date of Patent: May 19, 2026

(54) LOCKING SYSTEM FOR AN AIRCRAFT NACELLE

(71) Applicant: SAFRAN NACELLES, Gonfreville-l'Orcher (FR)

(72) Inventors: Jean-Philippe Joret, Moissy-Cramayel (FR); Vincent Dutot, Moissy-Cramayel (FR); Stéphane Riquier, Moissy-Cramayel (FR); François Bellet, Moissy-Cramayel (FR); Charles-Antoine Lampaert, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/574,845

(22) PCT Filed: Jun. 27, 2022

(86) PCT No.: PCT/FR2022/051271
§ 371 (c)(1),
(2) Date: Dec. 28, 2023

(87) PCT Pub. No.: WO2023/275474
PCT Pub. Date: Jan. 5, 2023

(65) Prior Publication Data
US 2024/0300661 A1       Sep. 12, 2024

(30) Foreign Application Priority Data
Jul. 2, 2021    (FR) ........................................ 2107211

(51) Int. Cl.
*B64D 29/06*          (2006.01)
*B64D 29/08*          (2006.01)

(52) U.S. Cl.
CPC ............. *B64D 29/06* (2013.01); *B64D 29/08* (2013.01)

(58) Field of Classification Search
CPC ........... B64D 29/06; B64D 29/08; F02K 1/80
See application file for complete search history.

(56)              References Cited

U.S. PATENT DOCUMENTS 5,152,559 A * 10/1992 Henrichs ................ B64D 29/06
                                                          292/DIG. 31
2004/0012212 A1    1/2004 Pratt et al.
(Continued)

FOREIGN PATENT DOCUMENTS

EP          2042429 A2      4/2009
EP          2420447 A2      2/2012
(Continued)

OTHER PUBLICATIONS

International Search Report mailed Sep. 29, 2022, issued in corresponding International Application No. PCT/FR2022/051271, filed Jun. 27, 2022, 6 pages.
(Continued)

*Primary Examiner* — Andrew H Nguyen
(74) *Attorney, Agent, or Firm* — Christensen O'Connor Johnson Kindness PLLC

(57)                ABSTRACT
A locking system for an aircraft nacelle is provided. The locking system includes a first portion configured to be mounted on a first part of an aircraft nacelle, and a second portion configured to be mounted on a second part of the aircraft nacelle. The locking system can be configured such that, when it is in the closed position, the first portion and the second portion are held together. The locking system further includes at least one buffer part and a load sensor joined together and configured to compress the load sensor between
(Continued)

the buffer part and another part of the locking system when the locking system is in the closed position.

9 Claims, 8 Drawing Sheets

(56) References Cited

U.S. PATENT DOCUMENTS

| | | | | |
|---|---|---|---|---|
| 2009/0078846 A1* | 3/2009 | Isebrand | ................ | B64D 29/06 |
| | | | | 248/542 |
| 2009/0173823 A1* | 7/2009 | Shetzer | .................. | B64D 29/06 |
| | | | | 244/129.4 |
| 2012/0043978 A1* | 2/2012 | Eriksen | ................... | G01L 1/142 |
| | | | | 324/690 |
| 2018/0245371 A1* | 8/2018 | Hernandez | ............. | B64D 29/06 |

FOREIGN PATENT DOCUMENTS

| | | | |
|---|---|---|---|
| FR | 2926537 | A1 | 7/2009 |
| FR | 3007390 | A1 | 12/2014 |
| FR | 3013682 | A1 | 5/2015 |

OTHER PUBLICATIONS

Written Opinion mailed Sep. 29, 2022, issued in corresponding International Application No. PCT/FR2022/051271, filed Jun. 27, 2022, 8 pages.

* cited by examiner

Prior Art

Prior Art

Prior Art

Prior Art

Prior Art

LOCKING SYSTEM FOR AN AIRCRAFT NACELLE

CROSS-REFERENCE TO RELATED APPLICATIONS

This application is a National Stage of International Application No. PCT/FR2022/051271, filed Jun. 27, 2022, which claims priority to French Patent Application No. 2107211, filed Jul. 2, 2021, the entire disclosures of which are hereby incorporated by reference in their entirety for all purposes.

TECHNICAL FIELD OF THE INVENTION

The invention relates to the field of the aircraft nacelles and, in particular, to a locking system for such a nacelle.

TECHNICAL BACKGROUND

The prior art comprises in particular the documents EP-A2-2420447, EP-A2-2042429A2, FR-A1-2926537, US-A1-20040012212, FR-A1-301368 and FR-A1-3007390. FIGS. 1 to 9 illustrate an example of the use of a locking system for an aircraft nacelle according to the prior art.

In particular, FIGS. 1a, 1b and 2 show a nacelle 101 and a mast 103 connecting it to an aircraft wing (not shown), and FIGS. 3 to 9 show more particularly a locking system 105 for such a nacelle.

In the example shown in FIGS. 1a, 1b and 2, the nacelle 101 comprises an air inlet 107, a right cowling 109, a left cowling 111 and a thrust reverser 113. As shown more specifically in FIG. 1a and FIG. 1b, the right cowling 109 and the left cowling 111 are hinged by a hinge (not shown) which allows them to be opened and, consequently, the access to items of equipment located either in the fan area 115 or in the core area 117. Such access is particularly useful for perform maintenance on parts located in these areas. The fact that the cowlings of such a nacelle can be opened implies the use of one or more locking systems to ensure that the cowlings remain in the closed position during flight.

With reference to FIGS. 3 to 9, we will now describe a locking system according to the prior art.

In the example shown, five locking systems 105 are used to allow an assembly consisting of two cowlings 303 and 305 of an aircraft nacelle to move from an open position to a closed position.

The locking system 105 comprises a first portion 307 mounted on the first cowling 303 and a second portion 309 mounted on the second cowling 305. The first portion 307 comprises a hook 311, a hook housing 313, a handle 315, an orifice 317 and a first buffer part 319 (also referred to as a pad). The second portion 309 comprises a striker 321, a striker housing 323, a lug 325 (also referred to as spigot), a second buffer part 327 and adjustment wedges 329.

Actuating the handle 315 allows to cause the locking system 105 to move from a first position, referred to as the open position, to a second position, referred to as the closed position, and vice versa. In particular, in the closed position, the hook 311 is engaged in the striker 321 so that it exerts a pull on it.

In addition, insofar as the first portion 307, which comprises the hook 311, is mounted securely to the cowling 303 and the second portion 309, which comprises the striker 323, is mounted securely to the cowling 305, when the hook 311 pulls on the striker 321 it holds the cowling 303 and the cowling 305 together. In other words, when the locking system 105 is in the closed position, the assembly comprising the cowlings 303 and 305, shown in FIG. 3, is closed.

The orifice 317 and the lug 325 have complementary shapes adapted so that the lug 325 can be inserted into the orifice 317 when the locking system 105 is tilted in closed position. In addition, by inserting the lug 325 into the orifice 317, the hook 311 is aligned with the striker 321 so that it can be engaged in said striker 321 if necessary.

The buffer parts 319 and 327 are positioned on facing surfaces of the first portion 307 and the second portion 309 of the locking system 301 so as to bear against each other, at the level of a contact plane 331 between the two portions visible in FIG. 9. In addition, adjustment wedges 329, adjoined to the buffer part 327 and to the lug 325, allow the precise position of this contact plane 331 to be adjusted for each locking system 105.

In an example such as the one described above, the hinge is typically located at the top of the nacelle and the locking systems at the bottom. As a result, the locking systems are difficult to see when the cowlings are closed, as they are located in an area of the nacelle that is close to the ground.

The risk is that certain locking systems could be left in the open position by an operator without this being observed on the ground and, as a result, the cowlings could open in flight.

To remedy this problem, it is known to use oversized locking systems, i.e. locking systems which individually exert a higher tensile force than that strictly necessary to close the cowlings, but which allow to compensate for the possible failure of another locking system in the assembly of locking systems used.

It is also known to use inductive sensors, implanted in the locking system, to detect the fact that a hook of said locking system is actually engaged in a striker or not.

It is also known to integrate a force sensor into a screw that allows the rotation of a hook of the locking system. So, when the hook is closed, the screw undergoes a force (a deformation) which is measured and used to determine whether the locking system is in the open or closed position.

In all cases, the solutions used in the prior art involve the addition of components that have a significant mass and/or cost due to their complexity, as well as the difficulty of integrating them into existing locking systems.

SUMMARY OF THE INVENTION

The present invention proposes a locking system intended to overcome the aforementioned disadvantages.

To this end, according to a first aspect, the invention relates to a locking system for an aircraft nacelle comprising a first portion, intended to be mounted on a first part of an aircraft nacelle, and a second portion, intended to be mounted on a second part of the aircraft nacelle, said locking system being configured so that, when it is in the closed position, said first portion and said second portion are held together, said locking system being characterised in that it further
   comprises at least one buffer part, positioned on a
   surface of a portion of the locking system opposite a
   surface of another portion of the locking system so as
   to be brought to bear on said other portion when said
   locking system is in the closed position, and a load
   sensor, adjoined to said buffer part, and in that, when
   said locking system is in the closed position, said load
   sensor is compressed between said buffer part and
   another element of said locking system.

The system according to the invention may comprise one or more of the following characteristics, taken alone or in combination with each other:

the first portion comprises a hook and a hook housing and the second portion comprises a striker and a striker housing, said locking system being configured so that, when in the closed position, said hook exerts a pull on the striker so that the first portion and the second portion are held together.

the load sensor is positioned between the buffer part and the hook housing and, when said locking system is in the closed position, said load sensor is compressed between said buffer part and said hook housing.

the locking system further comprises generating means configured to generate a signal representative of the closure of the locking system, when the load sensor measures a load greater than a determined threshold value.

the load system is further configured so that, when said locking system is in the open position, no load is exerted on the load sensor.

when said locking system is in the open position, the load sensor is held by the buffer part, said buffer part being connected to the other element of the locking system, preferably by a pivot-slide type connection, with an attachment clearance adapted to allow it to slide in said other element.

the locking system is further configured so that, when said locking system is in the open position, a load below the determined threshold value is exerted on the load sensor.

when said locking system is in the open position, the load sensor is held in position by the buffer part, said buffer part being tightened onto the other element, preferably by a nut, so that said load sensor is compressed between said buffer part and said other element.

In a second aspect, the invention also relates to an aircraft nacelle comprising a first part, a second part, and a locking system according to the first aspect, the first portion of the locking system being mounted on the first part, the second portion of the locking system being mounted on the second part so that when said locking system is in the closed position, the first part and the second part are held together.

BRIEF DESCRIPTION OF THE FIGURES

The invention will be better understood and other details, characteristics and advantages of the present invention will become clearer from the following description made by way of non-limiting example and with reference to the attached drawings, in which.

Figure 1A:
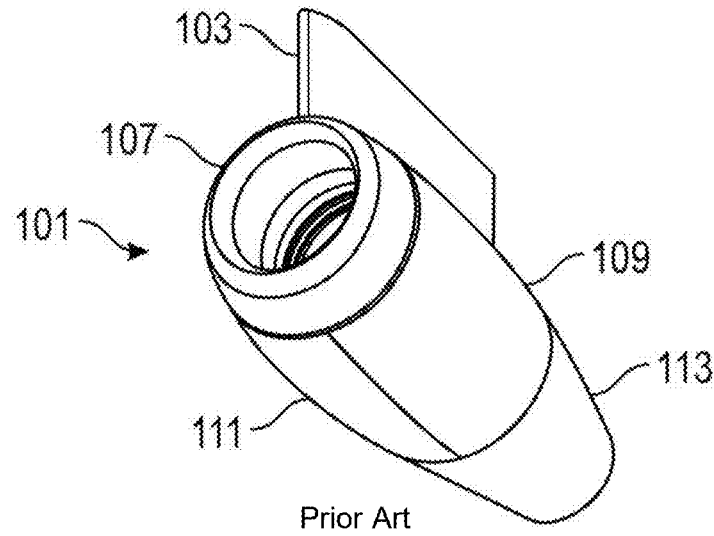
FIG. 1*a* is a perspective view of a nacelle according to one embodiment of the prior art.
Figure 1B:
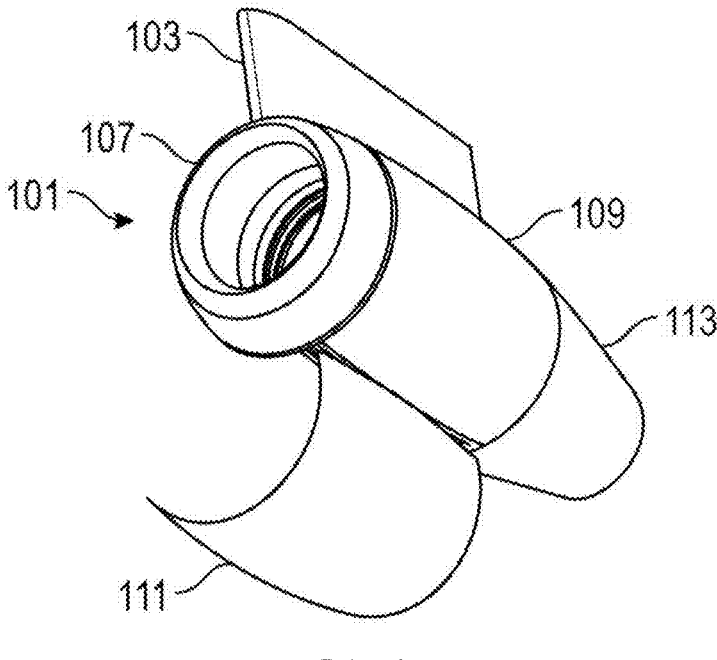
FIG. 1*b* is a perspective view of a nacelle according to one embodiment of the prior art.
Figure 2:
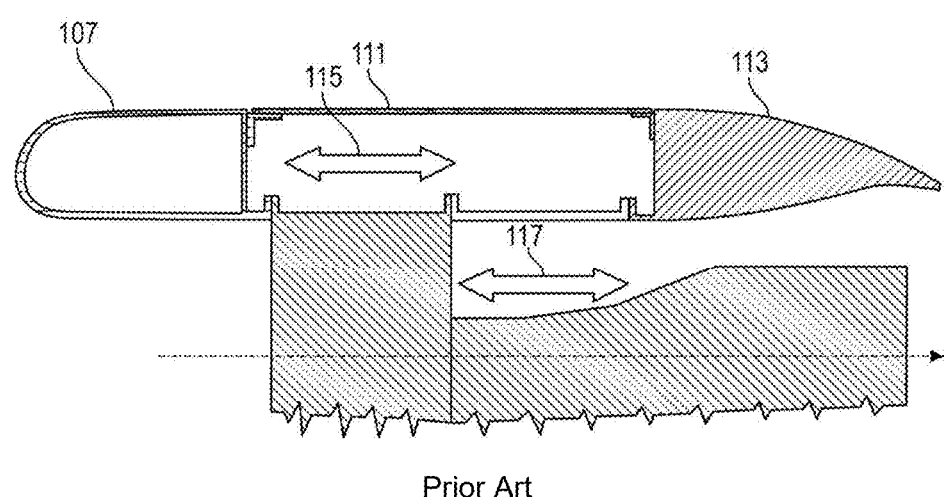
FIG. 2 is a cross-sectional view of a portion of a nacelle according to one embodiment of the prior art.
Figure 3:
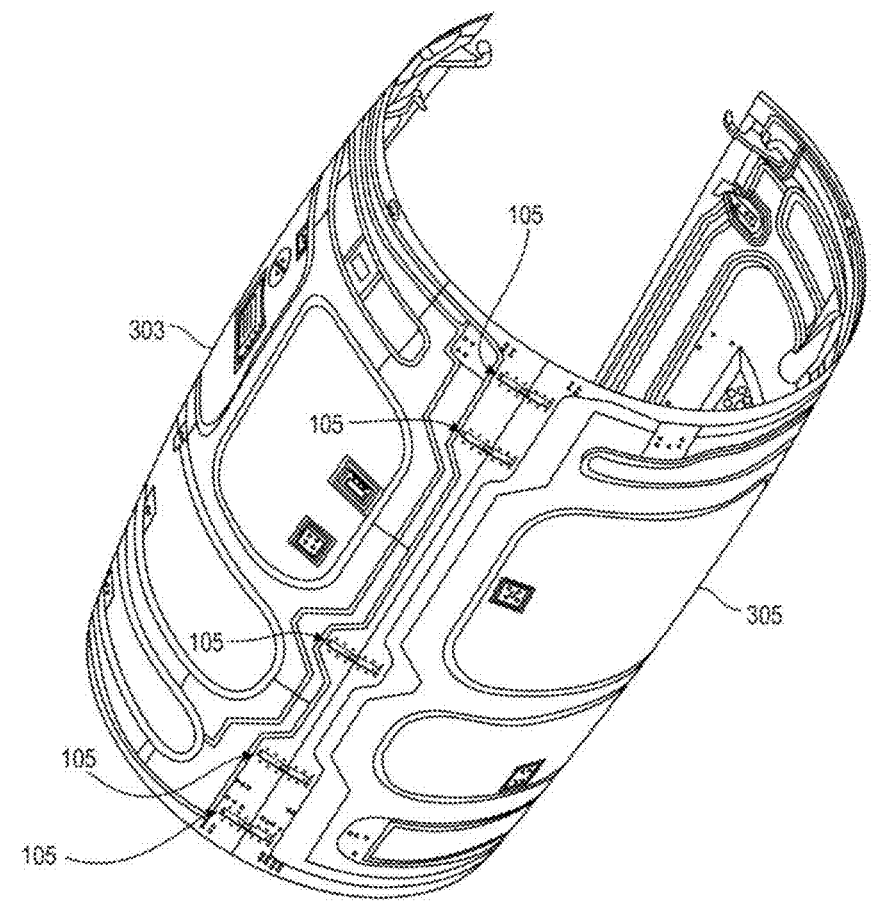
FIG. 3 is a perspective view of a cowling assembly of a nacelle in one embodiment of the prior art.
Figure 4:
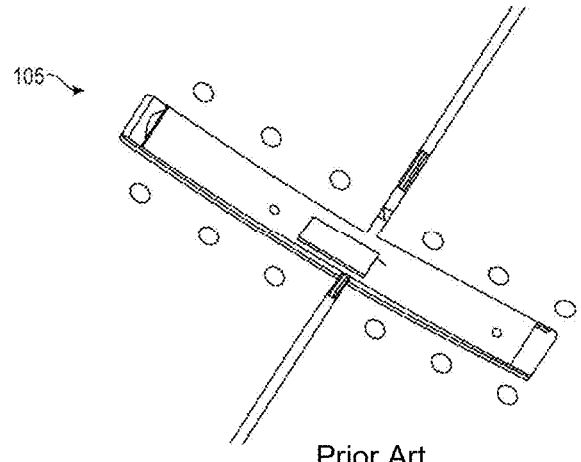
FIG. 4 is a perspective view of a locking system according to one embodiment of the prior art.
Figure 5:
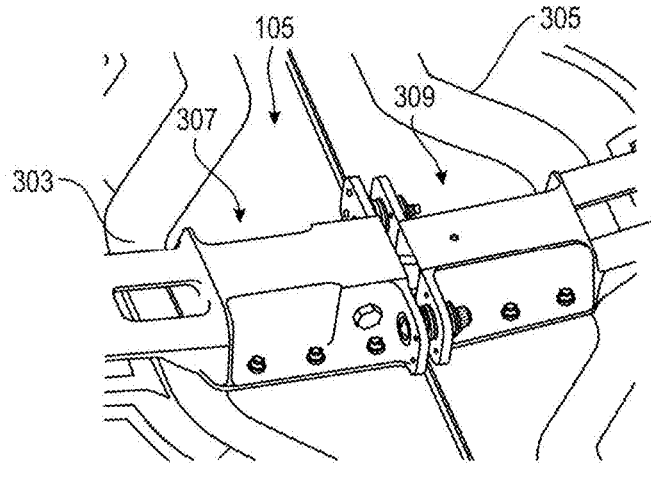
FIG. 5 is a perspective view of a locking system according to one embodiment of the prior art.
Figure 6:
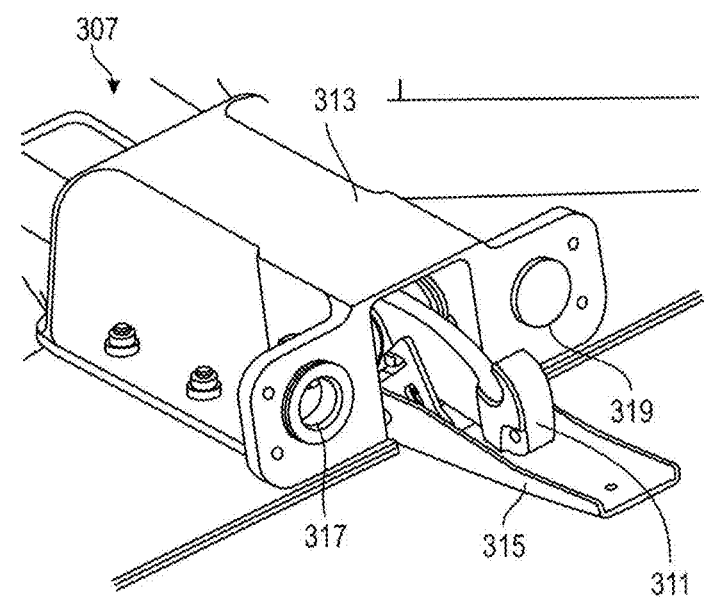
FIG. 6 is a perspective view of a first portion of a locking system according to one embodiment of the prior art.
Figure 7:
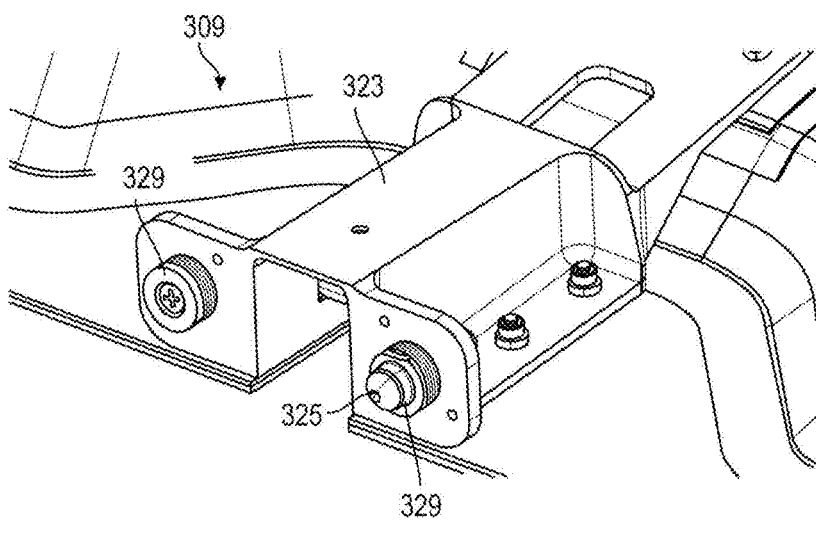
FIG. 7 is a perspective view of a second portion of a locking system according to one embodiment of the prior art.
Figure 8:
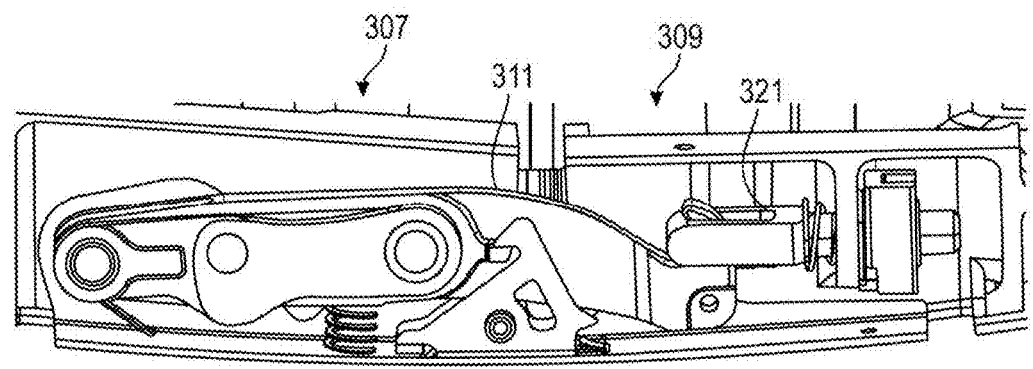
FIG. 8 is a cross-sectional view of a locking system according to one embodiment of the prior art.
Figure 9:
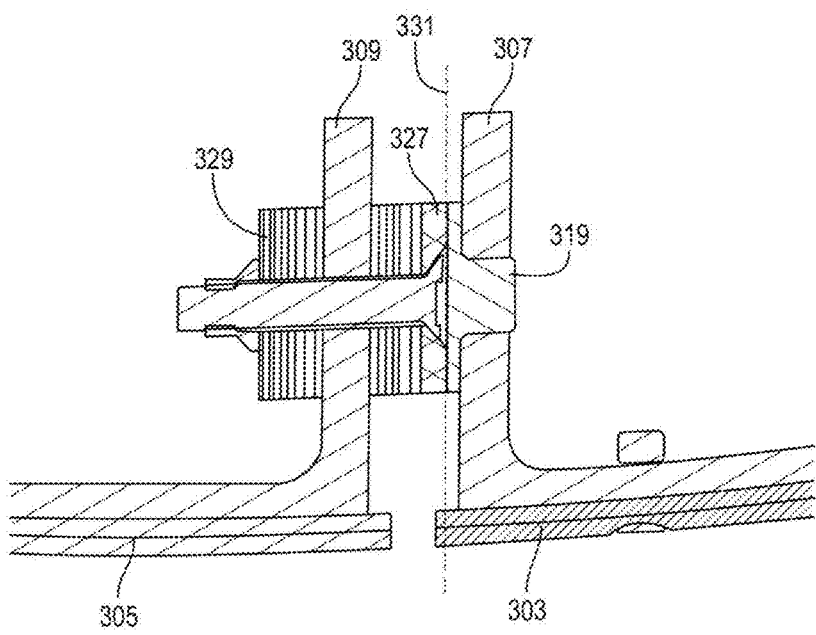
FIG. 9 is a perspective view of a segment of a locking system according to one embodiment of the prior art.
Figure 10:
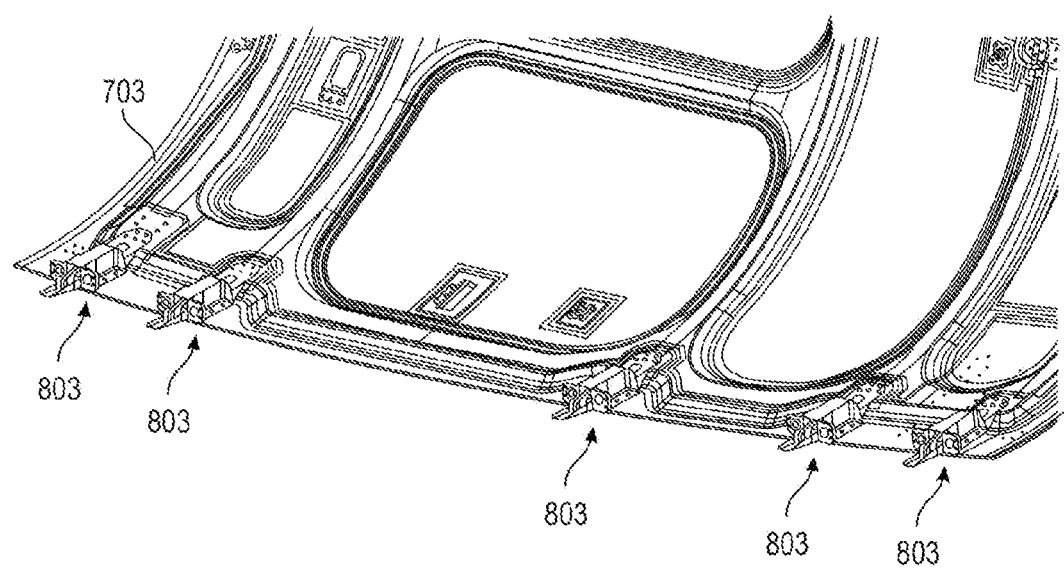
FIG. 10 is a perspective view of a cowling of a nacelle on which first portions of a locking system according to one embodiment of the invention are mounted.
Figure 11:
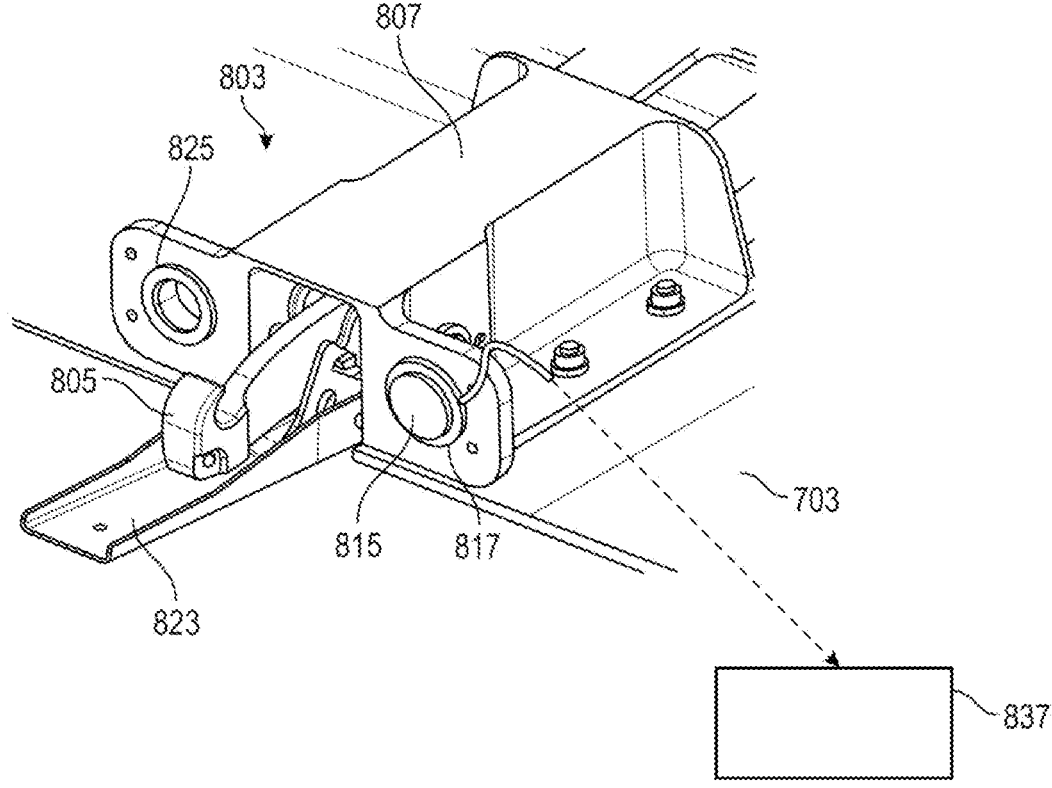
FIG. 11 is a perspective view of a first portion of a locking system according to one embodiment of the invention.
Figure 12:
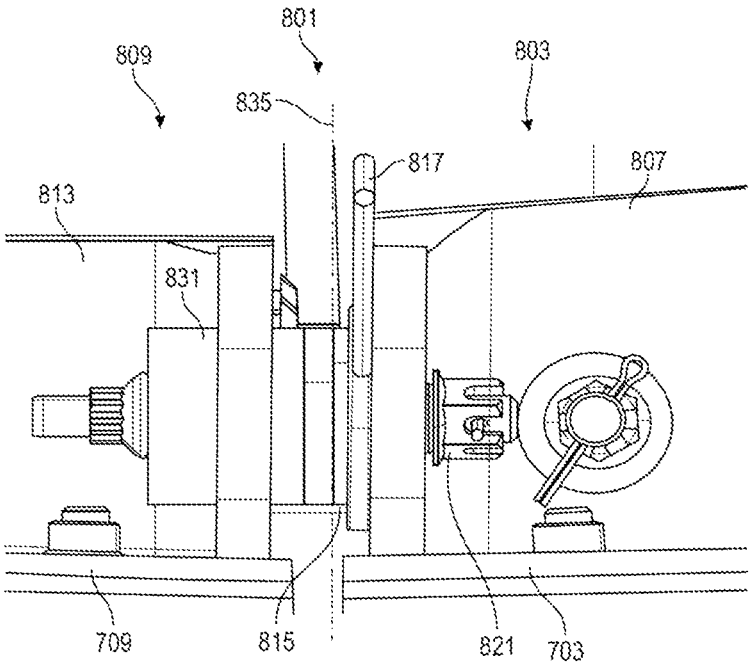
FIG. 12 is a cross-sectional view of a locking system according to one embodiment of the invention.

The elements having the same functions in the different embodiments have the same references in the figures.

DETAILED DESCRIPTION OF THE INVENTION

With reference to FIGS. 10 to 13, we will now describe an embodiment of a locking system according to the invention.

The locking system 801 for an aircraft nacelle comprises a first portion 803 which is mounted on a first part 703 of an aircraft nacelle, and a second portion 809 which is mounted on a second part 709 of the aircraft nacelle. In the example shown, the first part 703 and the second part 709 are two cowlings of an aircraft nacelle which are hinged by a hinge line so as to be able to open or close the assembly consisting of these two cowlings.

Generally speaking, according to the various embodiments of the invention, the two portions of the locking system can be intended to be mounted on various parts of an aircraft nacelle, such as fan cowlings, movables cowlings of grid thrust reversers, cowlings of half-reversers of a thrust reverser, thrust reverser doors or even hatches (such as a hatch for accessing a lock or an oil reservoir, for example). In other words, the invention applies to an assembly comprising portions hinged about an axis which are to be closed by a locking system which can be operated manually, hydraulically or electrically.

The locking system 801 is configured so that, when in the closed position, the first portion 803 and the second portion 809 are held together. In particular, insofar as the first portion 803 of the locking system 801 is mounted on a first part 703 (in this case a cowling) of the nacelle and the second portion 809 is mounted on a second part 709 (in this case also a cowling) of the nacelle, the passage of the locking system from the open position to the closed position causes the two portions of the locking system 801 to come into contact and the parts of the nacelle to be brought together at the level of said locking system 801.

More specifically, in the example shown, the first portion 803 comprises a hook 805 and a hook housing 807 and the second portion 809 comprises a striker 811 and a striker housing 813. In this way, the locking system 801 is configured so that, when in the closed position, the hook 805 exerts a pull on the striker 811 so that the first portion 803 and the second portion 809 are held together. In other words, the hook 805 engages the striker 811 and exerts a force that holds the two portions 803 and 809 together.

The person skilled in the art will appreciate that, in other embodiments, the elements of the first and of the second portion of the locking system which allow the two portions to be held together may be different.

In addition, in the various embodiments, it is possible to use different means to switch from an open position to a closed position. Such as, for example, a cylinder whose two end portions are mounted on the two parts of the aircraft nacelle to open or close said nacelle. The two parts in question may or may not be brought into contact by the action of the cylinder. In addition, in a particular embodiment, said cylinder can incorporate a locking system such as that of the invention.

The first portion 803 also comprises a handle 823, an orifice 825, a first buffer part 815 and a nut 821 for attaching the buffer part 815, while the second portion 809 also comprises a lug 827, adjustment wedges 831, attachment means 819 for attaching (in this case a nut) the striker 811 and return means 833 (in this case a spring).

Conventionally, actuation of the handle 823 allows the locking system 801 to be moved from the open position to the closed position and vice versa, the orifice 825 and the lug 827 have complementary shapes adapted so that the lug 827 fits into the orifice 825 when the locking system 801 is in the closed position and the adjustment wedges 831 allow the position of the contact plane 835 between the two portions of the locking system 801 to be adjusted when it is in the closed position.

The locking system comprises a load sensor 817 (i.e. a sensor which measures a force, a stress) which is adjoined to the first buffer part 815 and positioned so as to be compressed between this buffer part 815 and the hook housing 807 when the locking system 801 is in the closed position. The load sensor can be, for example, a sensor using the piezoelectric effect to measure the charge exerted on it.

Advantageously, such a sensor can be economical, easy to integrate and low in mass.

In the example shown, the buffer part 815 is positioned on a surface of the portion 803 of the locking system 801 opposite a surface of the other portion 809 of the locking system 801 so as to bear on said other portion 809 when the locking system 801 is in the closed position. In addition, the buffer part 815 has a disc-shaped end which is in contact with the other portion of the locking system when it is in the closed position. This end is extended by a cylindrical segment on which the annulus-shaped load sensor 817 is inserted. This is therefore located around this cylindrical segment of the buffer part 815, between the disc-shaped end of this same buffer part 815 and a flat surface of the hook housing 807.

Thus, when the hook 805 exerts a pull on the striker 811, the load sensor 817 is compressed between these two parts and measures a given load from which it is possible to identify the closure of the locking system 801. Furthermore, in the event of the failure of such a load sensor, it is possible to use in addition another detecting means for detecting the closure or to use a sensor referred to as three-level detection sensor, i.e. a sensor detecting three different levels of load from which it is possible to identify the opening, the closure and the failure of a locking system. In addition, in an embodiment not shown, it is also possible to superimpose three sensors, at the level of a single buffer part, and with the same detection level, so as to be able to extract several pieces of information from each measurement and, if necessary, identify a fault.

The locking system 801 may also comprise means 837 (schematically shown in FIG. 11) which generate a signal representative of the closure of the locking system 801, when the load sensor 817 measures a load greater than a determined threshold value. These means may be integrated into the load sensor 817, as in the example shown, or external to the latter. The signal used to indicate that the locking system is closed can be, for example, an electrical signal, an audible signal or a light signal.

In this way, exceeding a threshold value-which the person skilled in the art will know how to adapt to a particular use-results in the presentation of information on this closure which can be read by an operator. For example, a light signal appearing in the cabin of the pilot.

In addition, the threshold value can be adapted so that, if the second portion 809 of the locking system 801 rests on the first portion 803 without the locking system 801 being in the closed position, the load measured by the load sensor 817 remains below this threshold value.

In a particular embodiment, the locking system can be configured so that, when in the open position, no load is exerted to the load sensor. In other words, the load sensor is not compressed when the locking system is open.

Figure 13:
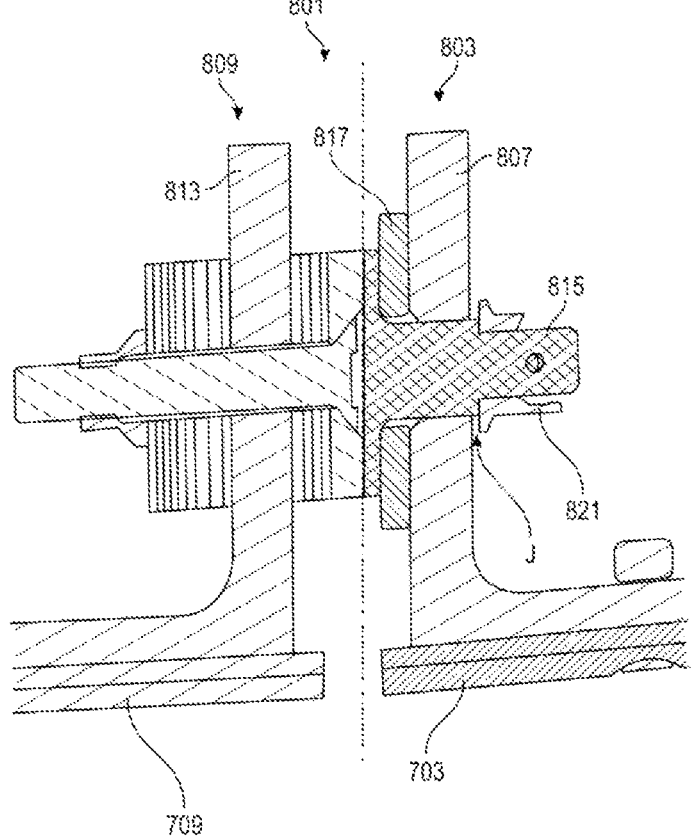
FIG. 13 is a cross-sectional view of a locking system according to one embodiment of the invention.

In the example shown in FIG. 13, the load sensor 817 is held by the buffer part 815 when the locking system is in the open position. In addition, the buffer part 815 is connected to the hook housing 803 by a pivot-slide connection with an attachment clearance J which is adapted to allow the buffer part 815 to slide in the hook housing 807. Thus, when the second portion 809 of the locking system 801 is not resting on the first portion 803, no load is exerted on the load sensor 817.

Alternatively, the locking system can be configured so that, when it is in the open position, a load lower than the determined threshold value (i.e. lower than the value which causes the locking system to be identified as closed) is exerted on the load sensor 817.

Thus, in a configuration similar to that shown in FIG. 13, the nut 821 is tightened so that there is no clearance J. In other words, the load sensor 817 is held in position by the buffer part 815 and the buffer part 815 is tightened by the nut 821 on the hook housing 807 so that the load sensor 817 is compressed between the buffer part 815 and the hook housing 807 even when the locking system 801 is in the open position.

In addition, in this embodiment, the load exerted on the load sensor 817 as a result of the buffer part 815 being tightened by the nut 821 is less than that resulting from the locking system 801 moving to the closed position. In this way, the closed position of the locking system 801 is only detected when the locking system 801 is actually closed.

Figure 14:
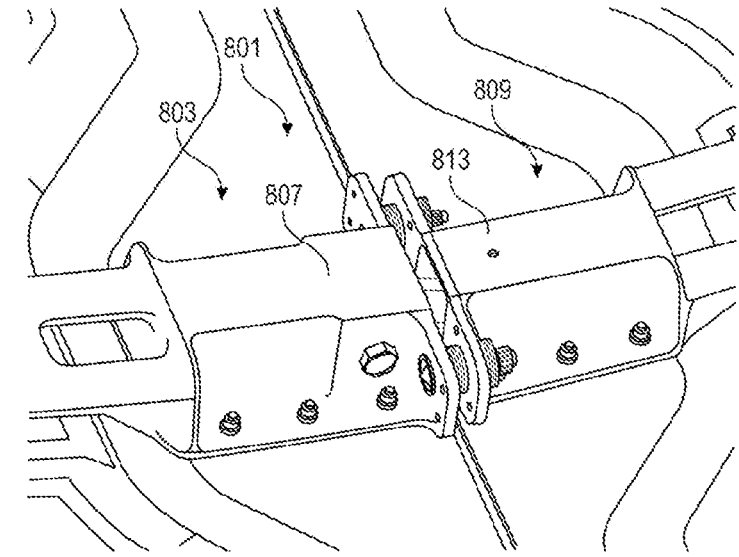
FIG. 14 is a perspective view of a locking system according to another embodiment of the invention; and, FIG. 15 is a cross-sectional view from above of a locking system according to another embodiment of the invention.
Figure 15:
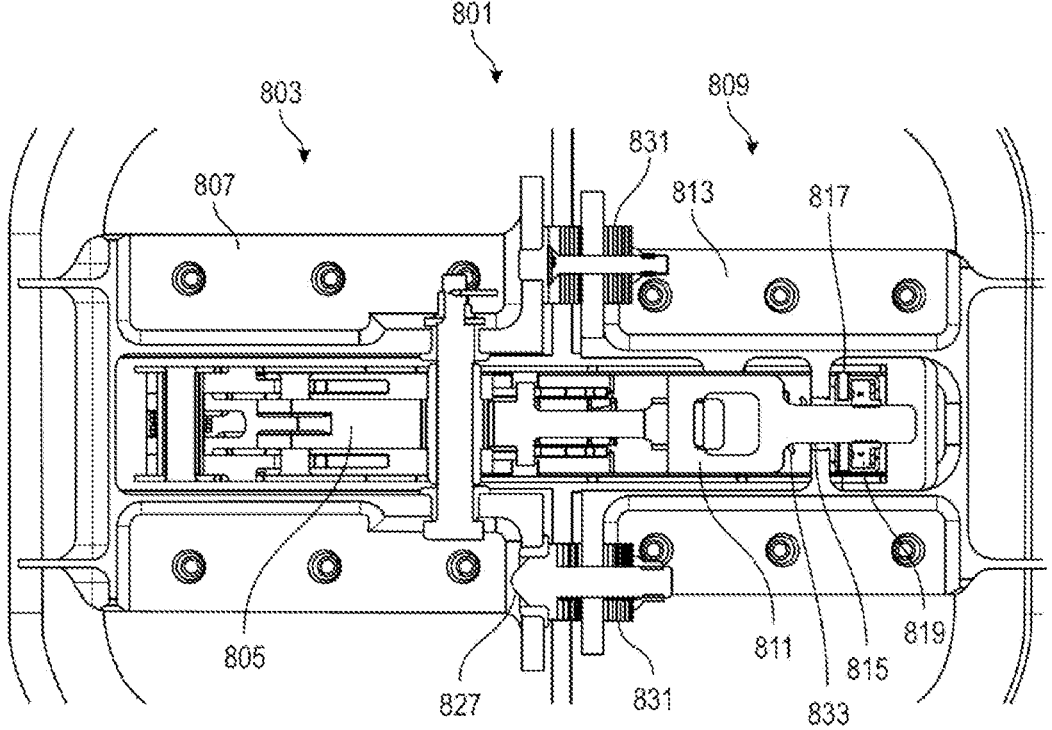

FIG. 14 and FIG. 15 show a locking system in which the load sensor 817 is positioned between the buffer part 815 and an attachment means 819 for attaching (in the particular case described, a nut) the striker 811. In this embodiment, when the locking system 801 is in the closed position, the load sensor 817 is compressed between the buffer part 815 and the attachment nut 819 for attaching the striker 811.

In addition, in the system, as seen in FIG. 15, the return means 833 for returning the striker 811, located at the level of the sensor of the striker, cause a compression of the load sensor 817 even when the locking system is in the open position. However, as in the case of the system described above, the load threshold value used to identify the closure of the locking system is higher than that measured when the locking system is in the open position so as not to cause false detection of a closure of the locking system 801. The person skilled in the art will appreciate that, whatever the precise positioning of the load sensor, it can be easily integrated into an existing locking system and minimise the weight introduced by adding means allowing to detect the closure.

Finally, by measuring the load using a load sensor located on one or other of the portions of the locking system, it is easy to identify when said locking system is closed.

The invention claimed is:

1. A locking system for an aircraft nacelle, comprising:

a first portion configured to be mounted on a first part of the aircraft nacelle;

a second portion configured to be mounted on a second part of the aircraft nacelle, the locking system being configured so that, when in a closed position, the first portion and the second portion are held together;

at least one buffer part, positioned on a surface of one of the first or second portions of the locking system opposite a surface of the other of the first or second portions of the locking system so as to be brought to bear on the other of the first or second portions when the locking system is in the closed position; and a load sensor, adjoined and operably coupled to the at least one buffer part, wherein, when the locking system is in the closed position, the load sensor is compressed between the at least one buffer part and another element of the locking system, and wherein the at least one buffer part has a disc-shaped end which is in contact with the other of the first or the second portion of the locking system when it is in the closed position and this disc-shaped end is extended by a cylindrical segment on which the load sensor, which is annulus-shaped, is inserted.

2. The locking system according to claim 1, wherein the first portion comprises a hook and a hook housing, and the second portion comprises a striker and a striker housing, wherein the locking system is configured such that, when in the closed position, the hook exerts a pull on the striker so that the first portion and the second portion are held together.

3. The locking system according to claim 2, wherein the load sensor is positioned between the at least one buffer part and the hook housing and wherein, when the locking system is in the closed position, the load sensor is compressed between the at least one buffer part and the hook housing.

4. The locking system according to claim 1, wherein the load sensor is configured to generate an electrical signal, an audible signal, or a light signal representative of the closure of the locking system when the load sensor measures a load greater than a determined threshold value.

5. The locking system according to claim 4, further configured such that when the locking system is in an open position, a load below the determined threshold value is exerted on the load sensor.

6. The locking system according to claim 5, wherein, when the locking system is in the open position, the load sensor is held in position by the at least one buffer part, wherein the at least one buffer part is tightened onto the other element by a nut so that the load sensor is compressed between the at least one buffer part and the other element.

7. The locking system according to claim 1, further configured such that when said locking system is in an open position, no load is exerted on the load sensor.

8. The locking system according to claim 7, wherein, when the locking system is in the open position, the load sensor is held by the at least one buffer part, wherein the at least one buffer part is connected to the other element of the locking system by a pivot-slide type connection with an attachment clearance adapted to allow the at least one buffer part to slide into the other element.

9. An aircraft nacelle, comprising:

a first part;

a second part; and a locking system according to claim 1, the first portion of the locking system being mounted on the first part, the second portion of the locking system being mounted on the second part so that when the locking system is in the closed position, the first part and the second part are held together.

* * * * *